Patented Apr. 19, 1949

2,467,958

UNITED STATES PATENT OFFICE 2,467,958

DIENOPHILIC ADDUCT RESIN INTERMEDIATE

Herman S. Bloch, Riverside, Ill., assignor to Universal Oil Products Company, Chicago, Ill., a corporation of Delaware No Drawing. Application June 22, 1944, Serial No. 541,651

14 Claims. (Cl. 260—342.4)

This application is a continuation-in-part of my copending application Serial No. 491,229, filed June 17, 1943, now abandoned.

The present invention relates to the production of a new material suitable for use in various organic syntheses, such as the preparation of resins, coatings, varnishes, etc.

When hydrocarbons are reacted in the presence of a catalyst which promotes conjunct polymerization reactions, under carefully controlled conditions of reaction, the used catalyst phase can be made to contain certain valuable material including a major proportion of polyolefinic cyclic compounds having a high degree of conjugated unsaturation. This material which can be recovered from the catalyst phase is referred to in the present specification and claims as organic diluent. It is believed that some of the hydrocarbon compounds of the organic diluent are physically entrained or dissolved in the used catalyst while the remainder are in the form of complex compounds with the catalyst.

Although the organic diluent has been defined in terms of hydrocarbon compounds, the invention also applies to reactants and organic diluents not strictly hydrocarbon in nature. For example, organic diluent may be formed in alkylation reactions involving the use of alcohols, esters, ethers, or alkyl halides as alkylating agents. On the other hand, halogen-containing organic diluent may be recovered from certain reactions involving the use of alkenyl halides or polyhalogenated paraffins or oxygen-containing organic diluent may be recovered from certain reactions involving the use of unsaturated ethers or esters. In general, the organic diluent may be recovered by decomposing the catalyst complexes and then separating, as by fractional distillation, by other physical or by chemical means, the highly unsaturated compounds with which we are concerned from more saturated primary reaction products which may also be present in the catalyst phase.

The organic diluent results from conjunct polymerization and the catalyst employed should therefore be one capable of accelerating the conjunct polymerization reaction. Conjunct polymerization of an olefin includes a series of reactions; namely, the polymerization of an olefin to form a higher molecular weight olefin or cyclic hydrocarbon followed by dehydrogenation of the cyclic hydrocarbon to yield cyclo-olefins and hydrogen atoms and hydrogenation of part of the olefin to a paraffin by means of the liberated hydrogen. If the charging stock comprises a paraffinic rather than an olefinic charge, the paraffinic hydrocarbon must first undergo reaction to form olefins before conjunct polymerization can take place. For this reason, if a paraffinic stock is used, it is preferable to employ a highly branched chain paraffin material which undergoes conversion to olefinic material much more rapidly than will a normal paraffin. Even if conditions and a catalyst are employed which will form a catalyst phase with a normal paraffin charge, the organic diluent recovered from the catalyst phase contains little or no material having the desired conjugated olefinic unsaturation. When catalysts such as an aluminum halide, hydrogen fluoride or sulfuric acid are employed, the saturated material produced during the conjunct polymerization reaction forms an upper layer while the highly unsaturated material combines with the catalyst in a lower layer from which the organic diluent employed in my invention is recovered.

An object of this invention is to provide a new material comprising a polyolefinic polycyclic dibasic acidic adduct containing more than two double bonds per molecule.

Another object of the invention is to provide a process for the manufacture of a new material comprising a polyolefinic polycyclic dibasic adduct containing more than two double bonds per molecule.

Other objects of my invention are the preparation of alkyd resins and modified alkyd resins by utilizing the polyolefinic polycyclic adducts as starting material.

To accomplish the first object of my invention, I react a dibasic acidic dienophile with organic diluent containing a major proportion of polyolefinic cyclic compounds having a high degree of conjugated unsaturation under conditions such that the reaction of the dienophile with said polyolefinic conjugated material of the organic diluent constitutes the principal reaction.

To prepare the alkyd resins of my invention I further react the polycyclic polyolefinic dibasic acidic adduct with a polyhydric alcohol or with a polyhydric alcohol, a natural glyceride oil or the components thereof, and/or various other compounds having a modifying effect on the properties of the resin product.

In one embodiment the present invention relates to the preparation of a new composition which comprises reacting an olefin-containing hydrocarbon in the presence of a catalyst which promotes conjunct polymerization, separating the reaction mixture into a hydrocarbon phase and a catalyst phase containing organic diluent, treating the catalyst phase to recover organic diluent therefrom, and reacting said organic diluent with a dibasic acidic dienophile at a temperature below 120° C. to form a polycyclic polyolefinic acidic adduct.

The organic diluent employed in preparing the composition of the present invention may be secured in a number of different ways. For example, it may be derived from the catalyst phase formed in such processes as the alkylation of an isoparaffin with an olefin or other alkylating agent, the polymerization of normally gaseous or normally liquid olefins, the alkylation of aromatics, etc. The organic diluent may best be prepared, however, by treating an olefin containing charging stock which is substantially free from aromatics with a catalyst such as hydrogen fluoride, an aluminum halide, sulfuric acid, or the like.

Although the reaction conditions under which a catalyst phase is formed which contains the desired polyolefinic cyclic compounds vary over a rather wide range they must be carefully controlled. As the temperature increases the organic diluent contains less material having conjugated olefinic unsaturation and more compounds aromatic in character until finally the mixture of compounds becomes coke-like. Even at moderate temperatures this undesirable drop in the amount of conjugated unsaturated material present occurs if the reaction is continued for excessive lengths of time. When employing hydrogen fluoride as the catalyst, reaction temperatures will range from about —20 to about 95° C. With aluminum chloride temperatures from about 25 to about 125° C. are preferred, while with sulfuric acid the temperature used is generally slightly lower than for aluminum chloride because of the oxidizing effect of sulfuric acid at the higher temperatures.

In general, the organic diluent comprises a series of high molecular weight cyclic compounds of wide boiling range but homologous structure of which a large portion contains conjugated olefinic double bond systems, though the exact composition of the organic diluent will vary somewhat depending upon the particular charging stock, the catalyst and the conditions of operation employed. In general, the material has a wide boiling range of about 150 to over 450° C., density of about 0.83 to 0.93, index of refraction of 1.47 to 1.53 (but usually 1.48 to 1.50), specific dispersion of about 125 to about 175 (but usually between 135 and 145), bromine numbers above about 140 (although they vary considerably with the average molecular weight) maleic anhydride values of about 30 to about 90 (usually in the range of about 45 to 75), acid number below 3, average number of olefinic double bonds per molecule varying between about 2.5 and about 4, of which from about 40 to about 70 per cent are conjugated, and excellent solubility in petroleum oils and vegetable oils such as linseed oil or tung oil. The organic diluents range in average molecular weights from about 200 to about 400, although the usual average is in the neighborhood of 300. Organic diluent fractions comprising compounds having molecular weights of as low as about 150 to as high as about 1000 have also been prepared. Although hydrogen to carbon atomic ratios of the organic diluent vary somewhat depending upon the particular source of the material, for an organic diluent derived from a hydrogen fluoride catalyst phase they range from about 1.67 to about 1.72 (for the various fractions) with the actual percentages of hydrogen varying from about 12.35 to 12.6. In the case of organic diluent recovered from an aluminum chloride catalyst phase the hydrogen to carbon atomic ratios range from about 1.58 to about 1.72 with the actual percentage of hydrogen averaging about 12.4.

The properties of the organic diluent will, of course, vary somewhat depending upon whether the entire boiling range of material or a specific fraction is employed. In general, the lower boiling fractions have similar properties regardless of the particular catalyst phase from which they are derived. The higher boiling fractions differ more widely, those derived from hydrogen fluoride catalyst phases being substantially non-aromatic and partly bi- or dicyclic, while those derived from catalyst complexes formed in reactions involving such catalysts as aluminum chloride or sulfuric acid contain a certain amount of aromatic hydrocarbons. More desirable final products are often obtained by using distillate fractions of the organic diluent. The distillation may be either vacuum, steam or atmospheric, the latter being carried out very rapidly. Although the present specification and claims are directed primarily to the use of the whole boiling range of material, it is to be understood that the treatment described also covers the use of specific fractions.

Dienophilic compounds suitable for reaction with the organic diluent all contain the grouping

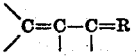

where R may be oxygen or nitrogen. For the preparation of the resinous products of this invention, the dienophile containing the above grouping should be a dibasic acid or simple derivative thereof. Although maleic anhydride is the preferred material for the reaction with the organic diluent, other dienophilic compounds which may be used, though not necessarily with equivalent results, include such acids as maleic, fumaric, mesaconic, citraconic, itaconic, etc., and their acid anhydrides, esters, amides or nitriles. The reaction of the organic diluent or fraction thereof with the dienophile is carried out at temperatures below about 120° C. When lower boiling fractions of organic diluent are employed, the reaction may even take place spontaneously, accompanied by an evolution of heat. When higher boiling fractions of organic diluent are utilized, the reactants must be heated, but in no case do the temperatures used reach those necessary to effect the reaction of aromatic or non-conjugated diolefinic or mono-olefinic compounds with a material such as maleic anhydride.

Upon reaction of the organic diluent and dienophile, an acid adduct is formed which consists of polycyclic polyolefinic dibasic acid compounds. The adduct comprises a mixture of compounds having an average molecular weight of between about 300 and about 500 and having for the most part at least two olefinic double bonds per molecule.

A typical operation for preparing the compositions of my invention may be carried out according to the following description, although the particular procedure described is not intended to limit the scope of the invention in any way.

To prepare the organic diluent a hydrocarbon charge containing normally gaseous and/or normally liquid olefins is treated in the presence of hydrogen fluoride under sufficient pressure to maintain the mixture in substantially liquid phase, said pressure usually being below about 500 pounds per square inch. Intimate contact between the hydrocarbons and catalyst may be maintained by some form of agitation such as mixing, stirring, etc., so as to form a mixture or emulsion of hydrocarbon and hydrogen fluoride. The reaction temperature may be from about 0 to about 300° F. and preferably from about 50 to about 200° F. Upon completion of the reaction, the products are allowed to settle and a hydrocarbon layer is separated from the catalyst layer which comprises chiefly acid and organic diluent. The catalyst phase is directed to an acid recovery zone wherein hydrogen fluoride is separated by distillation, treatment with water, and/or aqueous alkali or other suitable means and recycled to the reaction zone.

The material remaining after removal of hydrogen fluoride may be treated in a number of ways to remove any free acid left and to obtain a purified organic diluent. A simple method comprises either steam or vacuum distillation. Alternatively the purified organic diluent may be recovered by commingling the catalyst layer with water which serves to dissolve any free acid present, while the organic diluent rises to the top of the mixture and may be withdrawn. If desired, the fluidity of the catalyst layer may be increased by commingling it with a non-reactive hydrocarbon solvent such as pentane and after thorough mixing the solution is treated with a suitable alkaline reactant to neutralize any free acid present. The treated mixture is then directed to a separating zone in which the hydrocarbon solvent is removed by suitable means, such as distillation, and the desired product recovered. The organic diluent may be used in this form or may be further treated to improve its color by contact with a solid absorbent, by distillation as described above or by mild acid and clay treatment.

The polycyclic polyolefinic dibasic acidic adduct is prepared by mixing organic diluent or a selected fraction thereof with maleic anhydride or other dienophile and heating to a temperature of about 80° to about 110° C. until the reaction is complete. In some cases completion may be tested by determining the diene value of recovered unreacted hydrocarbons.

The proportion of maleic anhydride to organic diluent will vary, depending upon the character of the hydrocarbon mixture and the desired end product. If an amount of maleic anhydride equal to or less than the stoichiometric quantity which will react with the conjugated dienes in the oil (as shown, for example, by the diene value) is used, and the resultant mixture of adduct and unreacted oil is heated with a polyhydric alcohol, the resultant composition comprises an alkyd resin mixed with unreacted hydrocarbon material. The unreacted material has drying oil properties and improves the drying speed of the mixture when incorporated in many coating compositions. If more than the theoretical amount of maleic anhydride is used, the product will be harder and less soluble.

If desired, the unreacted hydrocarbons may be removed at this point. If left in the mixture until after reaction with the polyhydric alcohol, they may be removed after resinification, or if they are compatible with the products, they may be left in combination with them.

The high molecular weight acidic composition formed by reacting the organic diluent with an acid anhydride or one of the other dienophiles mentioned may be further reacted in a number of ways to form resins or various characteristics, detergents, siccatives, etc. For example, the adduct may be esterified with glycerin, pentaerythritol, or other polyhydric alcohol to form a hard, clear, light colored alkyd resin. Valuable products may also be prepared by the use of dihydric alcohols, such as ethylene glycol or polyethylene glycols, or of amino-alcohols. If desired, an excess of maleic anhydride may be added to the organic diluent and the unreacted anhydride then inter-esterified with the glycerin and the acid adduct. In an alternative method, maleic anhydride, phthalic anhydride, sebacic acid, or similar di- or polybasic acids may be added along with the glycerin to effect a similar inter-esterification.

If the adduct resulting from the reaction of maleic anhydride and organic diluent is to be reacted with a polyhydric alcohol such as glycerin, this is done at a temperature of between about 190 and about 270° C. The alkyd resin prepared in this manner has many of the properties of resins prepared from conventional acidic raw materials such as phthalic anhydride but may effect a saving of almost 50% in the amount of glycerin required.

If a more soluble alkyd resin is preferred, the reaction of the adduct with glycerin may be stopped short of complete esterification and the final setting may then be effected by a baking step.

To improve the solubility of the alkyd resins formed from the acid adduct and polyhydric alcohol and to give them air-drying properties, there may be incorporated in the reaction mixture unsaturated fatty acids, such as those occurring in vegetable oils (linseed oil or tung oil) or partial esters of these acids. If a softer material is desired, saturated fatty acids such as stearic or palmitic may be co-esterified with the adduct and polyhydric alcohol. Such acids also increase the solubility and flexibility of the resins and make products which are excellent plasticizers.

A number of methods of incorporating drying oil acids into the alkyd resins have been investigated and it has been found that the following methods can be used successfully when employing glycerin as the polyhydric alcohol: (1) The adduct, glycerin and the drying oil acids may be heated together to give a homogeneous resin; (2) The adduct and the partial ester of glycerin with drying oil acids may be heated together in equivalent amounts; (3) The partially esterified product of the adduct and glycerin may be heated with the drying oil acids and equivalent amount of glycerin to form a homogeneous resin if the partial ester of the adduct and glycerin has a relatively high acid number, that is, in the neighborhood of about 100. Less satisfactory products are formed employing the next three methods; (4) If the acid number of the alkyd made from the adduct and glycerin is too low, the product obtained by heating it with the drying oil acids and glycerin is non-homogeneous; (5) The adduct is heated with glycerin and a natural drying oil (that is, the glyceryl ester of the drying oil acids), and (6) A natural drying oil is heated with the partial ester of the adduct and glycerin.

A further variation includes the use of natural resins or resin acids in the co-esterification step to modify the hardness and glossiness of coatings derived from the resin so formed. Examples of such natural resin acids are abietic or pimaric acids.

The reaction products of maleic anhydride with materials such as butadiene, isoprene, terpene hydrocarbons, natural resins or other dienes, may likewise be incorporated with the intermediate compound formed by the reaction of the organic diluent and maleic anhydride in the manufacture of alkyd resins.

To obtain a modified alkyd resin having improved drying speed, the adduct may be co-esterified with a polyhydric alcohol in the presence of phenolic resins or their intermediates, or phenolics and vegetable acids of the type mentioned above. The resins containing phenols and drying oils should have improved durability and gloss.

The following examples illustrate my invention but should not be considered as limiting the generally broad scope of the invention in accordance therewith.

*Example I*

A polymer gasoline having the properties listed in the following table was reacted with hydrogen fluoride and the catalyst phase treated to recover the organic diluent which was utilized in the reaction with maleic anhydride.

| | |
|---|---|
| API gravity at 60° F. | 67.1 |
| $d_{60}^{60}$ | 0.7125 |
| Bromine number | 133 |
| Molecular weight (calc.) | 99 |
| Engler distillation: | |
| IBP. °F. | 81 |
| 10% over | 140 |
| 30 | 207 |
| 50 | 232 |
| 70 | 276 |
| 90 | 374 |
| E. P. | 413 |

The hydrocarbon charge was reacted with the hydrogen fluoride at a temperature of 172° F., pressure of 143 pounds per square inch gauge and a polymer gasoline to acid ratio of 4.23. After completion of the reaction the products were separated into a hydrocarbon and a catalyst phase, and the latter hydrolyzed with water to yield organic diluent having the following properties:

| | |
|---|---|
| Density ($d_4^{20}$) | 0.859 |
| Index of refraction ($n_D^{20}$) | 1.4846 |
| Specific dispersion | 138 |
| Molecular weight | 290 |
| Bromine number | 181 |
| Diene value | 82 |
| Gardner color | 11–12 |
| Acid number | 0.14 |
| Number of double bonds per mol. | 3.3 |
| Number of conjugated double bonds per mol. | 1.9 |
| Organic fluoride, per cent | 0.51 |

The organic diluent was refluxed for 6 hours at 80° C. with a toluene solution containing the theoretical amount of maleic anhydride. The adduct was separated from the unreacted hydrocarbons and toluene by extraction with hot dilute alkali and the toluene removed by vacuum distillation from the unreacted material. The adduct acids were precipitated by acidification and the alkaline solution, extracted with ether and separated from the latter by vacuum distillation.

The maleic anhydride adduct and equivalent amounts of glycerin were heated together in an atmosphere of carbon dioxide until the glycerin layer had disappeared and thickening had begun. Heating was continued for about 1 hour at 200 to 212° C. to effect bodying. The resinous product was a clear, amber colored material.

In a modification of the resin preparation, a vacuum was applied to the system when the resin had begun to thicken. The evacuation and heating was carefully controlled to avoid conversion of the resin to a brittle insoluble product. In still another variation of procedure the maleic anhydride adduct was evacuated at about 200° C. before the addition of glycerin. When the glycerin layer had disappeared (in about one-half the time needed without preliminary evacuation) the product was a clear, light colored, tacky solid soluble in toluene or naphtha. To reduce its acid number, which was rather high, however, the resin was further heated at 200 to 215° C. The acid number was lowered without any impairment of the solubility. Resins prepared in this manner are particularly suitable for use in baking finishes.

*Example II*

The used catalyst phase recovered from the alkylation of isobutane with a butane-butylene fraction in the presence of hydrogen fluoride was hydrolyzed with water and the separated organic diluent washed with caustic and dried. The recovered material had the following properties.

| | |
|---|---|
| Density ($d_4^{25}$) | 0.858 |
| Refractive index ($n_D^{25}$) | 1.481 |
| Specific dispersion | 137 |
| Bromine number | 179 |
| Diene number | 72 |
| Acid number | 0.5 |
| Viscosity (25° C.) centipoises | 7.4 |
| Average molecular weight | 230 |

10 parts by weight of the hydrocarbon material was refluxed for four hours at 110° C. with 54 parts by weight of a 6 per cent solution of maleic anhydride in toluene. The toluene solution was then refluxed for 30 minutes with 70 parts by weight of a 2/3 N. sodium hydroxide solution. The two layers were separated and the toluene was removed from the unreacted hydrocarbons in the upper layer by vacuum distillation, leaving a residual oil having the following properties:

| | |
|---|---|
| Density ($d_4^{25}$) | 0.936 |
| Bromine number | 94 |
| Maleic anhydride value | 0 |
| Refractive index ($n_D^{25}$) | 1.4935 |

When exposed on a glass plate this oil set to touch in 48 hours and dried hard in 72 hours. The aqueous layer was acidified with dilute hydrochloric acid and the precipitated acids extracted with ether, the ether solution dried, and the ether removed by distillation.

The adduct acids comprised a thick brown syrup of which the neutralization equivalent as determined by electrometic titration of an alcoholic solution was 160.

49 parts by weight of the adduct acids were heated for 45 minutes in an oil bath with 12 parts by weight of glycerin at 160 to 190° C. and brought to 240° C. in 10 minutes of further heating. The mixture was heated to 240° C. for 17 minutes more. The evolution of water became noticeable at 225 to 230° C. The duration of the heating coincided with the period during which water was evolved. The product was a clear, reddish-brown, homogeneous resin, partly soluble in mineral spirits, and when baked at 110° C., formed a hard, tough coating of yellowish-brown color. The coating was glossy, extremely resistant to abrasion, and insoluble in aromatic hydrocarbons.

When lighter colored resins are desired they may be obtained by employing distillate fractions of the organic diluent rather than the entire boiling range. The preparation of a light-colored resin is illustrated in the example which follows:

Example III

The catalyst phase resulting from the alkylation of isobutane and ethylene in the presence of aluminum chloride was subjected to hydrolysis and the organic diluent recovered. The organic diluent had the following properties:

| | |
|---|---|
| Density ($d_4^{20}$) | 0.885 |
| Refractive index ($n_D^{20}$) | 1.495 |
| Bromine number | 215 |
| Diene value | 89 |
| Acid number | 2.5 |
| Viscosity (25° C.) poises | 1.16 |
| Average molecular weight | 237 |

The material was vacuum distilled and 80 per cent taken overhead. The distillate was a light yellow oil having the following properties:

| | |
|---|---|
| Density | 0.867 |
| Refractive index | 1.488 |
| Bromine number | 240 |
| Diene value | 95 |

12.2 parts by weight of the distillate were mixed with 4.6 parts by weight of powdered maleic anhydride and the mixture heated at 100 to 110° C. for 3 hours in a nitrogen atmosphere. After cooling, the product was a clear, viscous reddish oil. To 5.9 parts by weight of the oil were added 1.03 parts by weight of glycerin. The mixture was raised to 225° C. in 20 minutes and held between 225 and 240° C. for 1 hour and 40 minutes at which time the material congealed. Upon cooling, the product was a light yellow, clear, hard resin having the color G on the rosin standard. It was partly soluble in toluene, alcohol, acetone, and butylacetate.

Example IV

A light fraction of pressure distillate (400 grams) having an end boiling point of 70° C. and containing 0.5% benzene, 51.5% olefins and a small amount of diolefins was reacted with anhydrous hydrogen fluoride (135 grams) for 2 hours at 60° C. and the organic diluent recovered from the catalyst phase. The organic diluent recovered from the lower catalyst layer amounted to 18.3% of the hydrocarbon charge or 35.6% of the olefins present in the charge. The properties of the organic diluent were:

| | |
|---|---|
| Bromine number | 159 |
| Density ($d_4^{20}$) | 0.869 |
| Color, Gardner | 11 |
| Diene number | 62 |
| Molecular weight | 343 |
| Index of refraction ($n_D^{20}$) | 1.4893 |
| Number of double bonds per mol. | 3.4 |
| Per cent of conjugation | 50 |

(It is estimated that 85% of the material contained one pair of conjugated double bonds per mol.)

The organic diluent was reacted with an equivalent amount of maleic anhydride at a temperature of 100° C. and the acidic adduct utilized in the preparation of alkyd resins.

Example V 350 grams of an organic diluent fraction boiling between 275 and 320° C. was heated with 106.5 grams of maleic anhydride for 6 hours at 80° C. 455.1 grams of adduct were obtained.

20 grams of the adduct was heated with 3.0 grams of ethylene glycol in an inert atmosphere for 33 hours at a temperature which was gradually raised from 165 to 250° C. During this time the acid number of the mixture dropped from 127 to 24. The product was a clear light yellow resin.

Modified alkyd resins were prepared employing a maleic anhydride adduct made as hereinabove described.

Example VI 26.6 grams of adduct was charged to a reaction vessel and the unreacted hydrocarbons removed from the reactor by evacuation at about 4 mm. pressure. Evacuation was carried out as the temperature was being raised. At 200° C. the vacuum was disconnected and 28.6 grams of glyceryl monolinoleate added. Heating was continued until a rather soft resinous material was formed. This was soluble in VM and P naphtha.

Example VII 20.3 grams of adduct anhydride was charged to a reactor and heated under vacuum to 200° C. while removing non-reactive organic diluent present in the adduct. After evacuation 4.6 grams of linseed oil fatty acid and 4.3 grams of glycerin were added to the adduct. The reactants were held at 200 to 210° C. for 5½ hours. The alkyd resin formed was a clear, light colored material which air dried within 48 hours to a hard glossy light colored film.

Example VIII

A 20 gallon oil length modified alkyd and varnish was prepared in the following manner: 61 grams of adduct, 21.1 grams of glycerin and 92 grams of linseed oil fatty acids were heated together at a temperature of between 220 to 230° C. for 5½ hours. The temperature was then increased to 245° C. when viscosity increased noticeably. The temperature was then cut back to between 225 to 230° C. and held there 3½ hours. A product having a viscosity of 400 poises was formed.

85 grams of VM and P naphtha, 0.3% lead and 0.03% cobalt naphthenate driers (based on oil content of the alkyd) were added to 127 grams of the alkyd. The addition of the solvent and driers was made at about 170° C. The completed varnish had a Gardner color of 10, a viscosity in poises at 25° C. of 5.0, a weight per gallon in pounds of 7.0 and non-volatile content of 59.4%. The alkyd when air dried set to touch in less than 5 hours and dried hard within 20 hours. It had an excellent color and gloss. When baked for 1 hour at 120° C. the film dried hard.

I claim as my invention:

1. As a composition of matter, the adduct formed by reacting at a temperature below 120° C. (1) an aliphatic dibasic acidic dienophile, and (2) a polyolefinic cyclic hydrocarbon fraction containing an average number from about 2.5 to about 4 double bonds per molecule of which from about 40 to about 70 percent are conjugated, said fraction being the organic decomposition product of the catalyst complex resulting from the catalytic conjunct polymerization of an olefin.

2. As a composition of matter, the adduct formed by reacting at a temperature below 120° C. (1) an aliphatic dibasic acidic dienophile, and (2) a polyolefinic cyclic hydrocarbon fraction containing an average number from about 2.5 to about 4 double bonds per molecule of which from about 40 to about 70 percent are conjugated, said fraction being the organic decomposition product of the catalyst complex resulting from the conjunct polymerization of an olefin in the presence of hydrogen fluoride.

3. As a composition of matter, the adduct formed by reacting at a temperature below 120° C. (1) an aliphatic dibasic acidic dienophile and (2) a polyolefinic cyclic hydrocarbon fraction containing an average number from about 2.5 to about 4 double bonds per molecule of which from about 40 to about 70 percent are conjugated, said fraction being the organic decomposition product of the catalyst complex resulting from the conjunct polymerization of an olefin in the presence of sulfuric acid.

4. As a composition of matter, the adduct formed by reacting at a temperature below 120° C. (1) an aliphatic dibasic acidic dienophile and (2) a polyolefinic cyclic hydrocarbon fraction containing an average number from about 2.5 to about 4 double bonds per molecule of which from about 40 to about 70 percent are conjugated, said fraction being the organic decomposition product of the catalyst complex resulting from the conjunct polymerization of an olefin in the presence of an aluminum halide.

5. As a composition of matter, the adduct formed by reacting at a temperature below 120° C. (1) an aliphatic dibasic acidic dienophile and (2) a polyolefinic cyclic hydrocarbon fraction containing an average number from about 2.5 to about 4 double bonds per molecule of which from about 40 to about 70 percent are conjugated, said fraction being the organic decomposition product of the catalyst complex resulting from the conjunct polymerization of an olefin in the presence of aluminum chloride.

6. As a composition of matter, the adduct formed by reacting at a temperature below 120° C. (1) maleic anhydride and (2) a polyolefinic cyclic hydrocarbon fraction containing an average number from about 2.5 to about 4 double bonds per molecule of which from about 40 to about 70 percent are conjugated, said fraction being the organic decomposition product of the catalyst complex resulting from the catalytic conjunct polymerization of an olefin.

7. A process for the production of resin intermediates which comprises reacting at a temperature below 120° C. (1) an aliphatic dibasic acidic dienophile and (2) a polyolefinic cyclic hydrocarbon fraction containing an average number from about 2.5 to about 4 double bonds per molecule of which from about 40 to about 70 percent are conjugated, said fraction being the organic decomposition product of the catalyst complex resulting from the catalytic conjunct polymerization of an olefin.

8. A process for the production of resin intermediates which comprises reacting at a temperature below 120° C. (1) an aliphatic dibasic acidic dienophile and (2) a polyolefinic cyclic hydrocarbon fraction containing an average number from about 2.5 to about 4 double bonds per molecule of which from about 40 to about 70 percent are conjugated, said fraction being the organic decomposition product of the catalyst complex resulting from the conjunct polymerization of an olefin in the presence of hydrogen fluoride.

9. A process for the production of resin intermediates which comprises reacting at a temperature below 120° C. (1) an aliphatic dibasic acidic dienophile and (2) a polyolefinic cyclic hydrocarbon fraction containing an average number from about 2.5 to about 4 double bonds per molecule of which from about 40 to about 70 percent are conjugated, said fraction being the organic decomposition product of the catalyst complex resulting from the conjunct polymerization of an olefin in the presence of sulfuric acid.

10. A pocess for the production of resin intermediates which comprises reacting at a temperature below 120° C. (1) an aliphatic dibasic acidic dienophile and (2) a polyolefinic cyclic hydrocarbon fraction containing an average number from about 2.5 to about 4 double bonds per molecule of which from about 40 to about 70 percent are conjugated, said fraction being the organic decomposition product of the catalyst complex resulting from the conjunct polymerization of an olefin in the presence of an aluminum halide.

11. A process for the production of resin intermediates which comprises reacting at a temperature below 120° C. (1) an aliphatic dibasic acidic dienophile and (2) a polyolefinic cyclic hydrocarbon fraction containing an average number from about 2.5 to about 4 double bonds per molecule of which from about 40 to about 70 percent are conjugated, said fraction being the organic decomposition product of the catalyst complex resulting from the conjunct polymerization of an olefin in the presence of aluminum chloride.

12. A process for the production of resin intermediates which comprises reacting at a temperature below 120° C. (1) maleic anhydride and (2) a polyolefinic cyclic hydrocarbon fraction containing an average number from about 2.5 to about 4 double bonds per molecule of which from about 40 to about 70 percent are conjugated, said fraction being the organic decomposition product of the catalyst complex resulting from the catalytic conjunct polymerization of an olefin.

13. As a composition of matter, the adduct formed by reacting at a temperature below 120° C. (1) an aliphatic dibasic acid anhydride and (2) a polyolefinic cyclic hydrocarbon fraction containing an average number from about 2.5 to about 4 double bonds per molecule of which from about 40 to about 70 percent are conjugated, said fraction being the organic decomposition product of the catalyst complex resulting from the catalytic conjunct polymerization of an olefin.

14. A process for the production of resin intermediates which comprises reacting at a temperature below 120° C. (1) an aliphatic dibasic acid anhydride and (2) a polyolefinic cyclic hydrocarbon fraction containing an average number from about 2.5 to about 4 double bonds per molecule of which from about 40 to about 70 percent are conjugated, said fraction being the organic decomposition product of the catalyst complex resulting from the catalytic conjunct polymerization of an olefin.

HERMAN S. BLOCH.

REFERENCES CITED

The following references are of record in the file of this patent:

UNITED STATES PATENTS

| Number | Name | Date |
|---|---|---|
| 1,944,731 | Diels et al. | Jan. 23, 1934 |
| 2,329,397 | d'Ouville et al. | Sept. 14, 1943 |
| 2,345,948 | Pellett | Apr. 4, 1944 |

OTHER REFERENCES

Glasebrook et al., Journal of American Chemical Society, volume 58 (1936), pages 1944–1948.

Birch et al., Ind. & Eng. Chemistry, January 1932, pages 49–50.

Oetringhaus, Petroleum (German pub.), volume 35, No. 31, pages 567–573.